(12) United States Patent
Waldspurger et al.

(10) Patent No.: US 8,775,903 B2
(45) Date of Patent: *Jul. 8, 2014

(54) TRANSPARENT RECOVERY FROM HARDWARE MEMORY ERRORS

(71) Applicant: VMware, Inc., Palo Alto, CA (US)

(72) Inventors: Carl A. Waldspurger, Palo Alto, CA (US); Dilpreet Bindra, Union City, CA (US); Gregory T. Harmon, Los Angeles, CA (US); Patrick Tullmann, Millbrae, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,465

(22) Filed: May 14, 2013

(65) Prior Publication Data

US 2013/0254612 A1 Sep. 26, 2013

Related U.S. Application Data

(63) Continuation of application No. 12/636,010, filed on Dec. 11, 2009, now Pat. No. 8,443,261.

(51) Int. Cl.
*G06F 11/00* (2006.01)

(52) U.S. Cl.
USPC ............................................. 714/764; 714/53

(58) Field of Classification Search
USPC ..................... 714/6.13, 52, 53, 763–766, 773
See application file for complete search history.

(56) References Cited

U.S. PATENT DOCUMENTS

| | | | |
|---|---|---|---|
| 6,789,156 B1* | 9/2004 | Waldspurger | 711/6 |
| 2007/0005935 A1* | 1/2007 | Khosravi et al. | 711/216 |
| 2007/0028051 A1* | 2/2007 | Williamson et al. | 711/128 |
| 2009/0113424 A1* | 4/2009 | Chen et al. | 718/1 |
| 2010/0031000 A1* | 2/2010 | Flynn et al. | 711/216 |

* cited by examiner

*Primary Examiner* — Bryce Bonzo
*Assistant Examiner* — Elmira Mehrmanesh

(57) ABSTRACT

A method is provided for recovering from an uncorrected memory error located at a memory address as identified by a memory device. A stored hash value for a memory page corresponding to the identified memory address is used to determine the correct data. Because the memory device specifies the location of the corrupted data, and the size of the window where the corruption occurred, the stored hash can be used to verify memory page reconstruction. With the known good part of the data in hand, the hashes of the pages using possible values in place of the corrupted data are calculated. It is expected that there will be a match between the previously stored hash and one of the computed hashes. As long as there is one and only one match, then that value, used in the place of the corrupted data, is the correct value. The corrupt data, once replaced, allows operation of the memory device to continue without needing to interrupt or otherwise affect a system's operation.

21 Claims, 7 Drawing Sheets

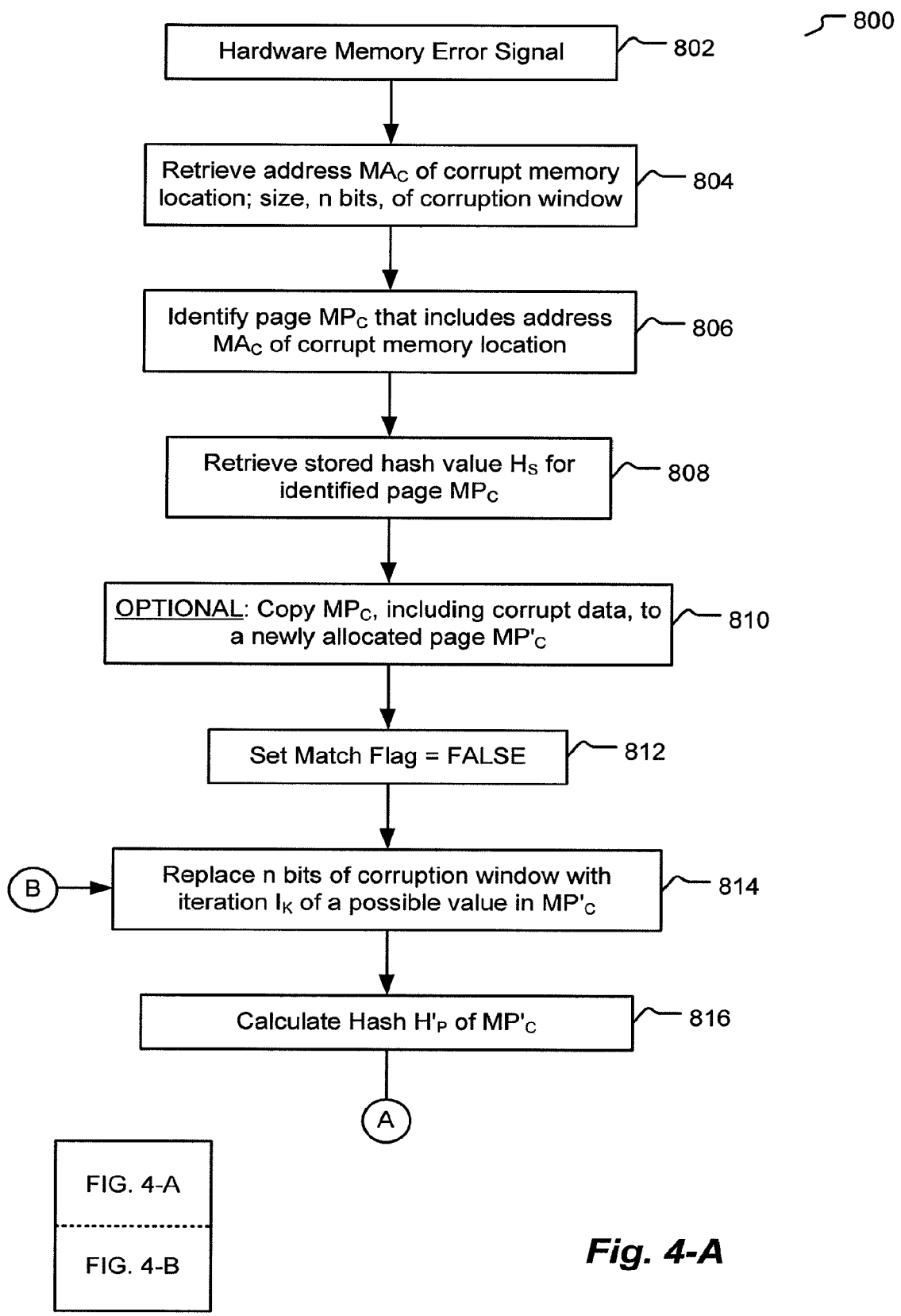
FIG. 4-A

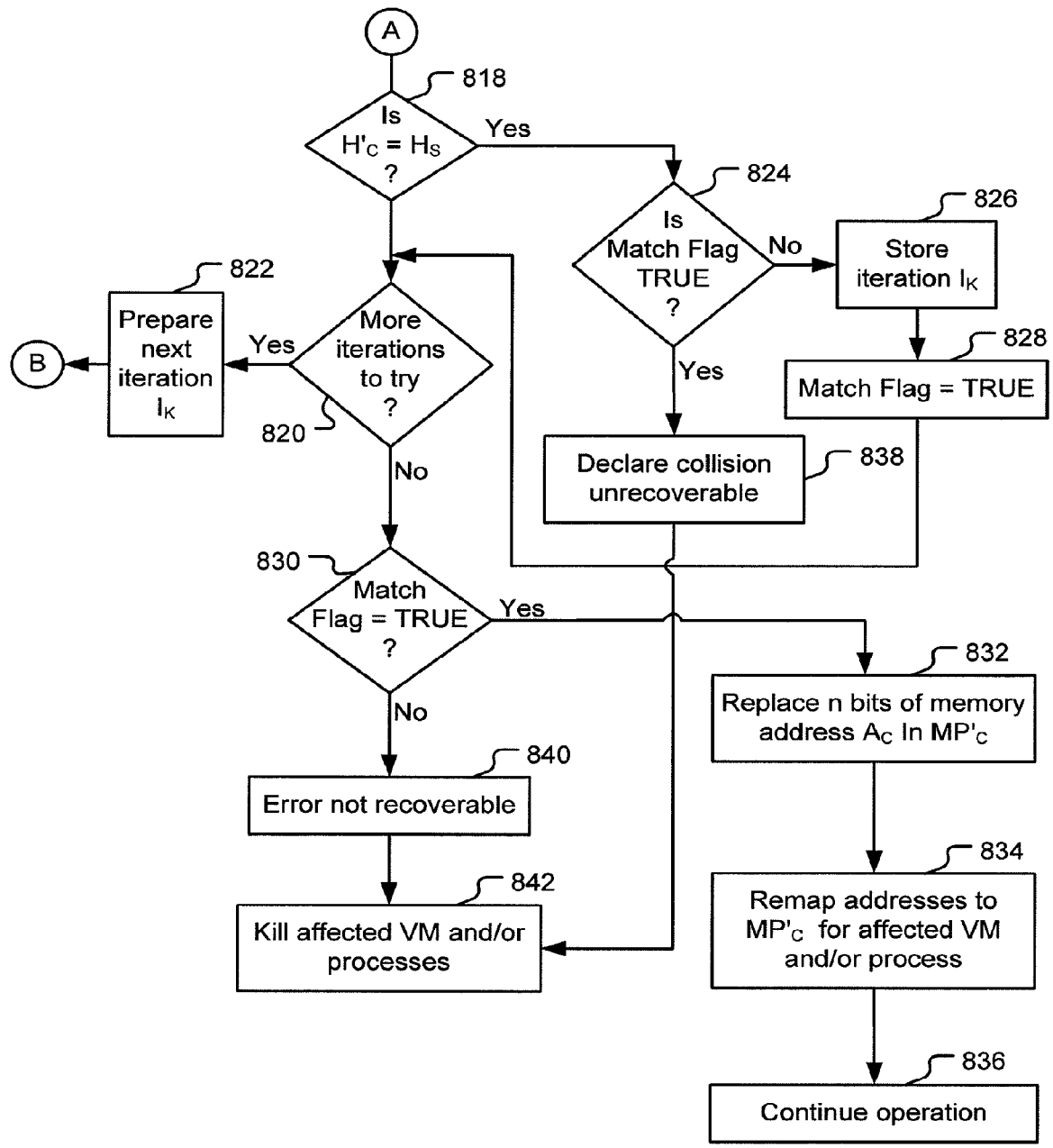
Fig. 4-B

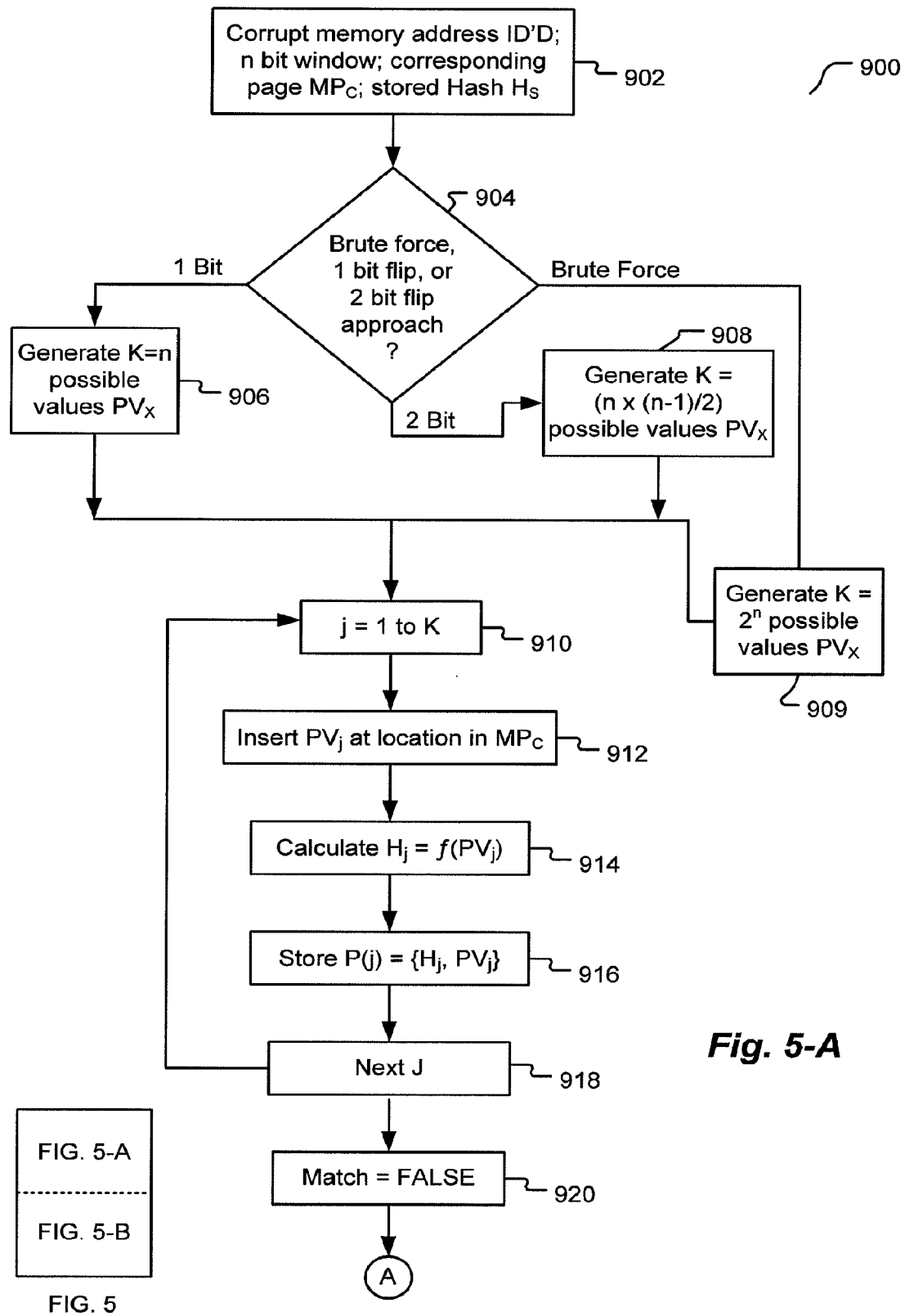
Fig. 5-A

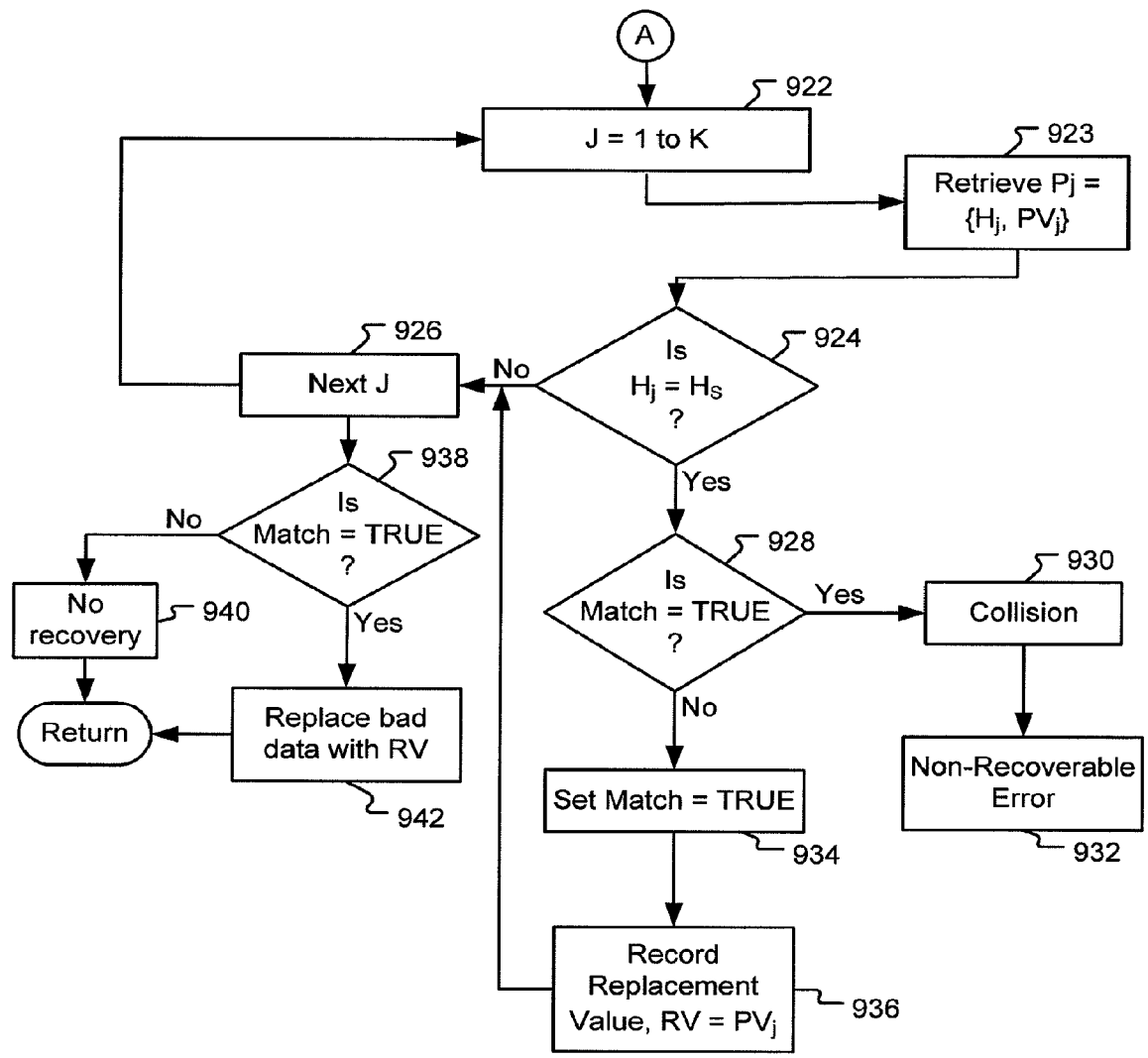
Fig. 5-B

TRANSPARENT RECOVERY FROM HARDWARE MEMORY ERRORS

CROSS-REFERENCE TO RELATED APPLICATIONS

This application is a Continuation of U.S. patent application Ser. No. 12/636,010, filed Dec. 11, 2009, which has issued as U.S. Pat. No. 8,443,261.

FIELD OF THE INVENTION

Embodiments of the present invention relate generally to the field of memory management in computer systems and, more specifically, to recovering from a corrupted memory condition.

BACKGROUND OF THE INVENTION

As the amount of memory and number of CPUs per computer system increases, the likelihood of memory errors also increases. As known, memory hardware can be built with the ability to correct data when a single bit is corrupted with features such as ECC (Error-Correcting Code), ChipKill from International Business Machines or ChipSpare from Hewlett-Packard. It is possible that more than one bit is corrupted within some fixed-size range, for example, a "window" of 256 bits as defined by the hardware implementation. The hardware, however, may not be able to recover and must signal to the operating system that it may no longer be safe to run due to a data corruption.

If the error did not corrupt internal CPU state, however, the operating system could choose to try to recover from the error. Within the class of recoverable errors, there are two further classifications: persistent and non-persistent (transient) errors. A transient error is one that happens just once and is often attributed to a cosmic ray collision as high-energy particles striking a memory chip can disturb the state of the RAM and cause the corruption. On the other hand, a persistent error is one where the memory hardware has failed and continues to corrupt the bit each time it is used.

In the event of an error, some known operating systems are able to kill or terminate the program or application that was using the memory, usually at a page level. One system that has done work in this area is Sun Microsystems' Solaris operating system. The contribution here is the ability to terminate processes affected by an uncorrected memory error. Additionally, the system will identify the memory, i.e., a memory page or pages, as not to be used and data will be stored at other locations. Suds ZFS file system also has the ability to repair silent data corruption. ZFS may have multiple copies of the same data and if one copy goes bad, ZFS uses a checksum to determine which remaining copy of the data is correct. This method does not, however, reconstruct the data when there was only a single copy and it is suspect itself.

Other operating systems panic the entire system immediately with just an error report. Ignoring the error report and continuing with no action being taken, however, risks corrupting user data or otherwise operating incorrectly.

SUMMARY OF THE INVENTION

Generally, a method is provided for recovering from an uncorrected memory error located at a memory address as identified by a memory device. A stored hash value for a memory page corresponding to the identified memory address is used to determine the correct data. Because the memory device specifies the location of the corrupted data, and the size of the window where the corruption occurred, the stored hash can be used to verify memory page reconstruction. With the known good part of the data in hand, the hashes of the pages using possible values in place of the corrupted data are calculated. It is expected that there will be a match between the previously stored hash and one of the computed hashes. As long as there is one and only one match, then that value, used in the place of the corrupted data, is the correct value. The corrupt data, once replaced, allows operation of the memory device to continue without needing to interrupt or otherwise affect a system's operation.

BRIEF DESCRIPTION OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures:

FIGS. 4, 4-A, 4-B combine as a flowchart of a method in accordance with one embodiment of the present invention; and FIGS. 5, 5-A, 5-B combine as a flowchart of a method in accordance with another embodiment of the present invention.

DETAILED DESCRIPTION

Figure 1:
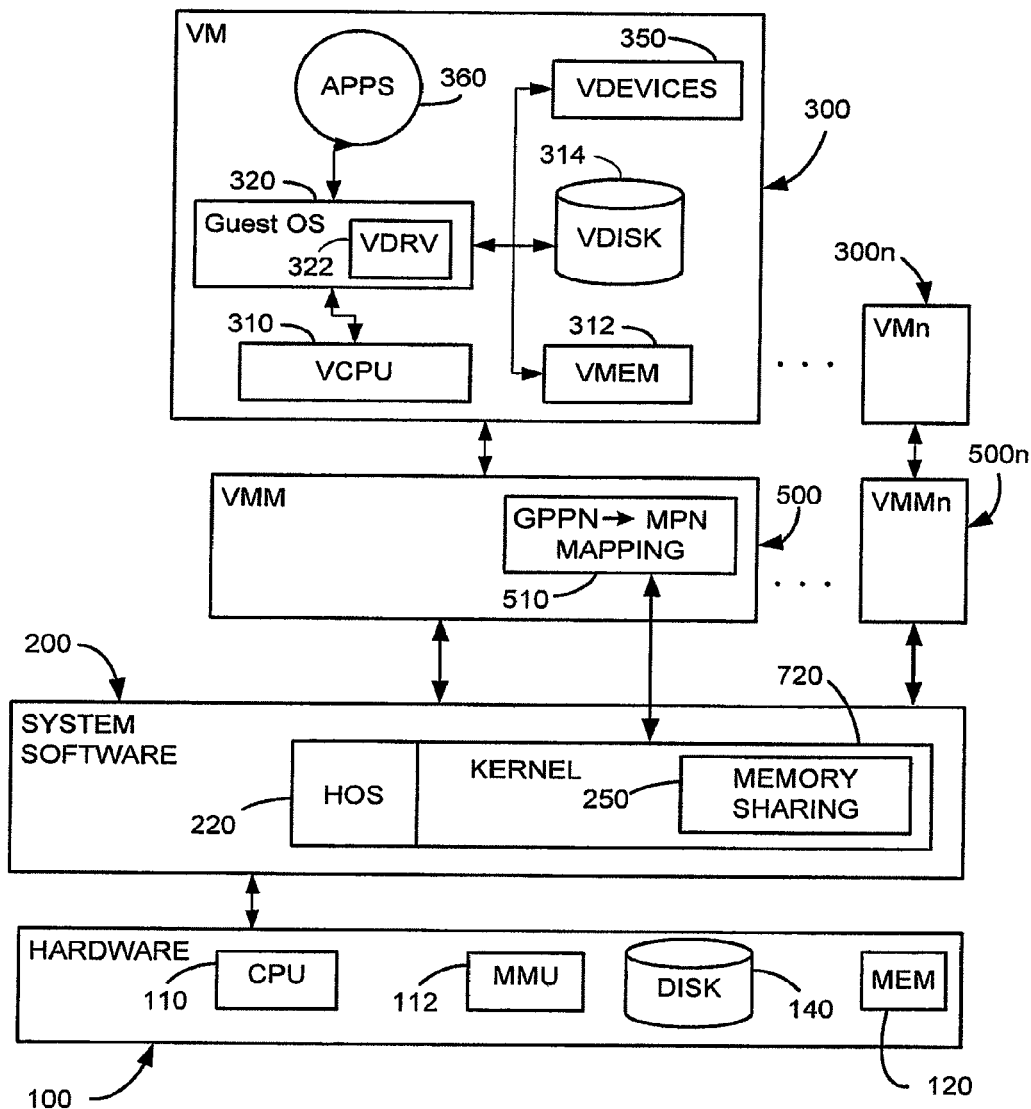
FIG. 1 is a block diagram of a system for implementing embodiments of the present invention.

Embodiments of the present invention provide a mechanism to leverage kernel metadata to enable the transparent recovery and repair of corrupted data, allowing a user of the memory, e.g., an application, to continue without knowing there was a problem. In various embodiments, the metadata could be part of a regular operating system or part of a hypervisor, i.e., a virtualized system. In an embodiment of the present invention implemented in a virtualized system, if the data reconstruction is not possible, then only the set of Virtual Machines (VMs) using the memory where the error occurred need be shut down instead of panicking the entire system.

An embodiment of the present invention includes a method to recover from an uncorrected memory error. This embodiment works in cases where the data is redundant, i.e., when there is another good copy on disk or elsewhere in memory, or when the system has stored a checksum or hash value of the contents of a memory page corresponding to where the data corruption has occurred. As will be discussed below, the transparent page-sharing system available from VMware, Inc., of Palo Alto, Calif., is one system where such a hash is maintained over certain pages of memory. Advantageously, as discussed below, because the hardware specifies the exact location of the corrupted data, and the size of the window where the corruption occurred, the stored hash can be used to verify memory page reconstruction.

With the known good part of the data in hand, in one embodiment of the present invention, the hashes of the pages using every possible value in place of the corrupted data can be calculated. It is expected that there will be a match between the previously stored hash and one of the computed hashes. As long as there is one and only one match, then that value used in the place of the corrupted data is the correct value. Depending on the architecture and speed of the hardware, various efficiencies can be adopted as it may or may not be feasible to hash all of the possible values for the location where the corruption occurred.

The techniques to be described herein will fully handle transient errors. For persistent errors, the machine memory address causing the problem should no longer be used. In accordance with one embodiment of the present invention, a copy of the correct page of data can be placed in another physical location and then the mapping used by the affected VM, or other component of the system, can be changed in accordance with known memory mapping paradigms. As a result, the VM will have its data corrected and no longer access the damaged physical memory so as to avoid future memory data corruption. All of this can happen under control of a virtual machine monitor (VMM) and hypervisor without the VM needing to know.

In the description to follow, an embodiment of the present invention is presented in the context of a virtualization platform, such as the VMware ESX hypervisor. Different aspects of the VMware ESX hypervisor, and other "unhosted" or "kernel-based" virtualization systems, have been described in different patents and applications assigned to VMware, Inc. The same techniques, however, can be applied in the context of a traditional non-virtualized operating system, the operation of which is well known to those of ordinary skill in the art.

In general, and as an overview to aid in understanding the various embodiments of the present invention, suppose that a VM is running and that the machine, i.e., the hardware system, encounters a hardware memory error at an address containing the VM memory. As known to one of ordinary skill in the art, one option and, perhaps, the simplest option, is to panic the entire system. A more sophisticated response is to determine which VM is affected, and kill that VM instead of panicking the entire system. Another option is to deliver a virtual hardware error to the guest. This may allow the guest to kill a single process while leaving others unaffected.

In embodiments of the present invention, a hash of the contents of the page corresponding to the identified corrupt memory is used to correct the error. There are several functions in virtualization systems available from VMware, Inc. of Palo Alto, Calif., that involve hashes of memory pages, although embodiments of the present invention are not limited to virtualized systems and could be implemented in non-virtual systems that store hashes of machine memory pages. The transparent, content-based page sharing mechanism also stores hashes of pages used to speed up the discovery of pages that can be shared read-only between VMs. It should be noted that the concept of "sharing" memory pages is related to "de-duplication" of resources and not to the sharing of a page in a read/write mode or as an explicit communications channel. In addition, VMware's VMsafe has a feature, verify-before-execute, that ensures a guest OS is executing the expected, i.e., "proper" code. This function also stores a hash of the code pages for verification. VMware's Overshadow project provides an application security mechanism that includes hashes used to verify data integrity and could be leveraged to repair corrupt data.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

As will become clear from the description below, embodiments of the present invention do not require any particular hardware platform. Nonetheless, because it is so common, and by way of example only, it is assumed below that an x86 architecture, e.g., as used in the Intel IA32 line of microprocessors, is being used.

As is well known, system memory is typically divided into individually addressable units, commonly known as "pages," each of which in turn contains many separately addressable data words, which in turn is comprised of some small number of bytes. Pages are identified by addresses commonly referred to as "page numbers." Embodiments of the present invention do not presuppose any particular page size. Any memory unit may be used and will require little or no modification of the embodiments of the invention described below.

U.S. Pat. No. 6,789,156 to Waldspurger for "Content-Based Transparent Sharing of Memory Units," (hereafter "Waldspurger '156 patent" or "the '156 patent,") the entire contents of which is hereby incorporated by reference for all purposes, implements content-based identification of units of a data storage space that different contexts, e.g., different virtual machines, may be able to share. In the '156 patent, the demand on the system memory can be reduced by allowing one or more contexts to share a single copy of a page of memory when possible, but creating private copies of the page when necessary. Sharing may take place either intra-context or inter-context, or both. The '156 patent describes various ways to determine when two pages of memory are identical and could be shared between contexts, for example, by storing hash values of each for later comparison.

The term "context" is used here to refer to any software or hardware component, device or system, that addresses and reads from the hardware memory and that has its own address translation (mapping) state. For a traditional OS, a "context" would typically be a "process," which has an address space and associated page tables that contain information about how to map virtual pages to physical pages, and also page-level protection information, such as "read-only" for copy-on-write (COW) pages.

In general, and as background for descriptions of embodiments of the present invention to follow, a system in accordance with the teachings of the '156 patent identifies one or more memory pages that can be shared between contexts, either individually or as a group, by using hash values.

As one embodiment of the present invention operates in conjunction with a system implementing page sharing and hashes, a general overview of such a page sharing system will first be discussed.

Referring now to FIG. 1, a representation of a virtualized system implementing page sharing in accordance with the '156 patent will be described in order to subsequently describe embodiments of the present invention. System hardware 100 includes a central processor (CPU) 110, which may be a single processor, or two or more cooperating processors, in a known multiprocessor arrangement. As in other known systems, the hardware includes, or is connected to, conventional registers, interrupt-handling circuitry, and a memory management unit MMU 112. The MMU 112 is usually integrated on-chip in modern CPUs and uses page table information that is established by the system software. A storage device 140, e.g., a disk drive, and memory 120, for example, RAM, are provided.

While not essential to the embodiments of the present invention, the CPU 110 described above may include "multi-core" or "CMP" (chip-level multiprocessor) devices. Each processor core in a multi-core CPU contains a separate MMU and one of ordinary skill in the art will understand how that would be implemented in the systems shown in FIG. 1.

As in other computer systems, the system software 200 includes a host operating system (HOS) 220, and drivers as needed for controlling and communicating with various devices and the system hardware 100. Embodiments of the present invention do not presuppose any particular host operating system, and because the characteristics and functions of operating systems are so well known, the HOS 220 need not be discussed in greater detail.

At least one virtual machine (VM) 300, . . . , 300n, is installed to run as a Guest on the host system hardware and software. As is well known in the art, a VM is a software abstraction—a "virtualization"—of an actual physical computer system. As such, each VM 300 will typically include one or more virtual CPUs 310 (VCPU), a Guest Operating System 320 (Guest OS) (which may, but need not, be a copy of a conventional, commodity OS), a virtual system memory 312 (VMEM), a virtual disk 314 (VDISK), virtual peripheral devices 350 (VDEVICES) and drivers 322 (VDRV) for handling the virtual peripheral devices 350, all of which are implemented in software to emulate components of an actual or physical computer. Although the key components of only one VM 300 are illustrated in FIG. 1, the structure of any other VM will be essentially identical.

Most computers are intended to run various applications, and VMs are no exception. Consequently, by way of example, as shown in FIG. 1, a group of applications 360 (which may be a single application) is installed to run at user level on the Guest OS 320; any number of applications, including none at all, may be loaded for running on the Guest OS, limited only by the capacity or requirements of the VM. In a properly designed VM an application (or a user of the application) will not "know" that it is not running directly on "real" hardware. As known to one of ordinary skill in the art, the applications and the components of the virtual machine 300 are instructions and data stored in memory, just as any other software. The concept, design and operation of virtual machines are well known in the field of computer science.

A virtual machine monitor (VMM) 500 operates as an interface between a VM and the combination of the underlying "real" OS 220 and the hardware 100. The OS 220 is real in the sense of being either the native OS of the underlying physical computer, or the OS (or other system-level software) that handles actual I/O operations, takes faults and interrupts, etc. The hardware 100 and the OS 220, together, are responsible for executing VM-issued instructions and transferring data to and from the actual, physical memory 120 and the storage devices 140.

The VMM 500 is usually a "thin" piece of software that runs directly on top of a host, or directly on the hardware, and virtualizes all, or at least some subset of, the resources of the machine. The interface exported by a VMM 500 to a respective VM 300 is the same as the hardware interface of the machine, or at least of some predefined hardware platform, so that the Guest OS 320 cannot determine the presence of the VMM. The VMM 500 also usually tracks and either forwards to the HOS 220, or itself schedules and handles, all requests by its VM for machine resources as well as handling various faults and interrupts. The general features of VMMs are known in the art and therefore need not be discussed in further detail here.

In FIG. 1, VMMs 500, . . . , 500n, are shown, acting as interfaces for their respective attached VMs 300, . . . , 300n. It would also be possible to include each VMM 500 as part of its respective VM 300, that is, in each virtual system. Moreover, it would also be possible to use a single VMM 500 to act as the interface to all VMs 300, . . . , 300n. The VMM 500 provides a well-defined, known interface between its corresponding virtual system 300 and the underlying system hardware 100 and system software 220.

In some known virtualization systems, VMMs run directly on the underlying system hardware 100, and will thus act as the "real" operating system for its associated VM. In other systems, the HOS 220 is interposed as a software layer between VMMs and the hardware. Still other arrangements are possible, and known to those of ordinary skill in the art. Each VMM will typically include other software components such as device emulators that emulate the characteristics of respective physical devices. Such components, and others such as an interrupt handler, etc., are common in VMMs but are not necessary to understand embodiments of the present invention and are, therefore, not illustrated or described here.

One advantage of virtualization is that each VM can be isolated from all others, and from all software other than the VMM, which itself will be transparent to the VM; indeed, as above, the user of a VM will usually be completely unaware that it is not a "real" computer. The VMM controls the mapping from Guest physical addresses to machine addresses (which may also be called host physical addresses). As a result, a change in mapping of Guest physical addresses to machine addresses can be accomplished in a manner that is transparent to the VM, and that does not require modifications to the Guest Operating System. Various patents and pending patent applications assigned to VMware, Inc. describe various aspects of memory mapping in virtualization systems.

A kernel 720 may be configured to function as a common interface between all VMMs and the HOS 220. The kernel 720, however, may instead be configured so as to act as, and thus effectively to replace, the HOS 220 itself with respect to scheduling of system resources and interrupt handling. In FIG. 1, the kernel 720 is shown as being a part of system software 200 along with the HOS 220 merely for the sake of illustration.

A memory sharing module 250 is located within the system-level software kernel 720, so that it will be able to set up memory page sharing not only for different applications within a single VM, but also between different VMs. Alternately, the memory sharing module 250 could be located in the VMM 500 as would be understood by one of ordinary skill in the art.

The applications 360 (and any other virtual component that runs on the Guest OS) typically address virtual memory, just as in a "real" computer. The Guest OS 320 maps guest virtual page numbers (GVPN) to what it "believes" are machine page numbers, referred to as Guest physical page numbers (GPPN). An additional mapping from GPPN to the actual machine memory page (MPN) must, therefore, take place in order to associate a given GVPN with the actual machine memory page MPN. The GVPN-to-GPPN mapping takes place within the VM 300 (usually under full control of the Guest OS). A memory mapping module 510 in the VMM 500 maintains a GPPN-to-MPN map, which may be designed as any other memory page map.

Embodiments of the present invention, as will be described in detail below, may be implemented in conjunction with the transparent page sharing feature of the ESX Server available from VMware, Inc. of Palo Alto, Calif.

Figure 2:
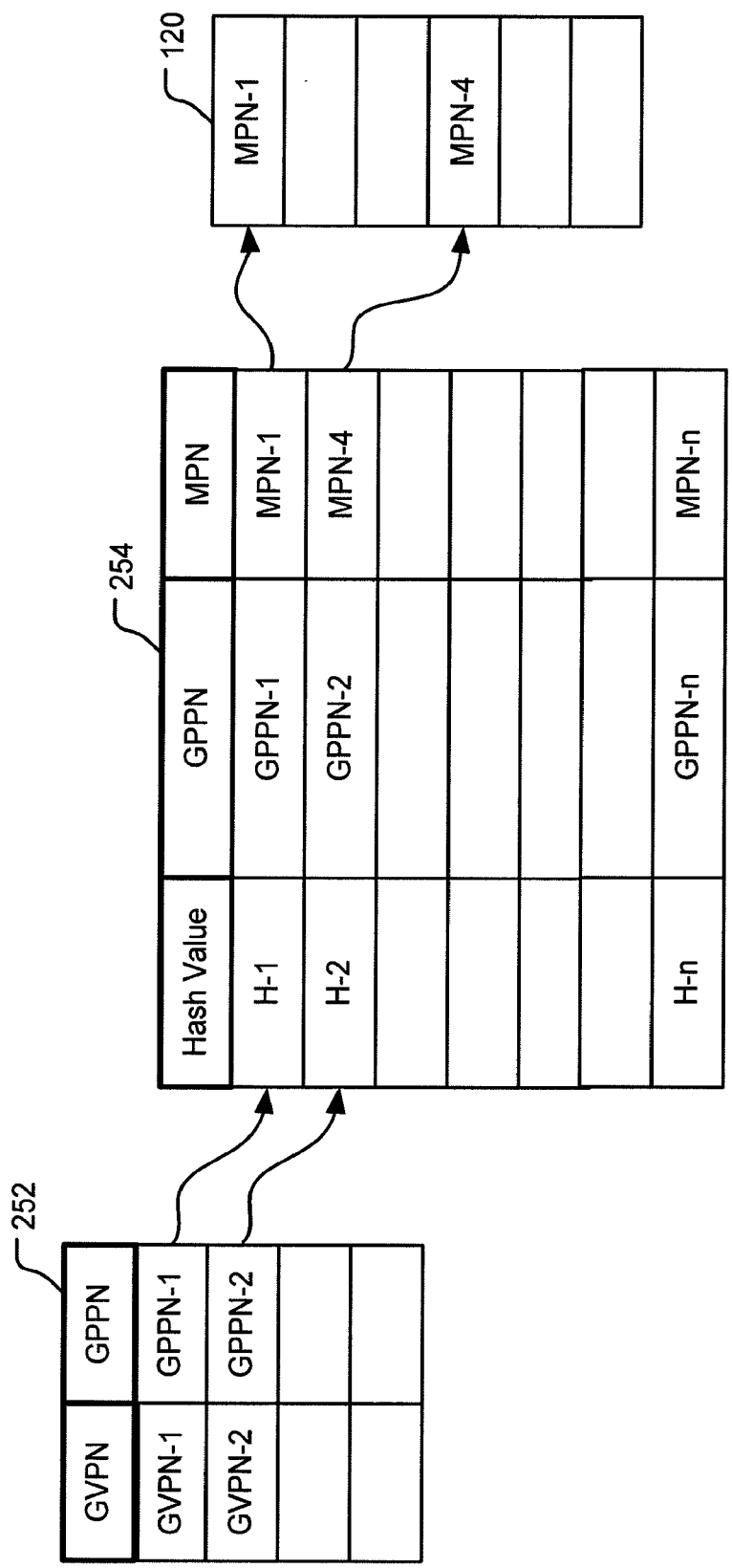
FIG. 2 is a block diagram of tables mapping virtual addresses to machine addresses and to hash values.

In a system that uses transparent page sharing multiple mappings as between a guest virtual page number (GVPN), a guest physical page number (GPPN), a hash value (H) and a machine page number (MPN) are maintained. Referring now to FIG. 2, conceptually, in a virtualized environment, it could be considered that a first table 252 maps a GVPN with a corresponding GPPN, with a second table 254 maintaining a hash value corresponding to a GPPN and a corresponding MPN. A reference to an MPN found in the second table 254 would represent a machine page number in the memory device 120. The foregoing is meant to represent a generalized, i.e., conceptual, representation of a relationship of a hash value and a machine page number as may be stored in a system available from VMware, Inc., of Palo Alto, Calif. The mappings found in the first and second tables 252, 254, in a virtualized system, may be found in one or the other of the VMM 500 or the memory sharing function 250 or elsewhere in the kernel 720. One of ordinary skill in the art will understand that the location of such stored hash values is a design choice and need not be further described herein.

Figure 3:
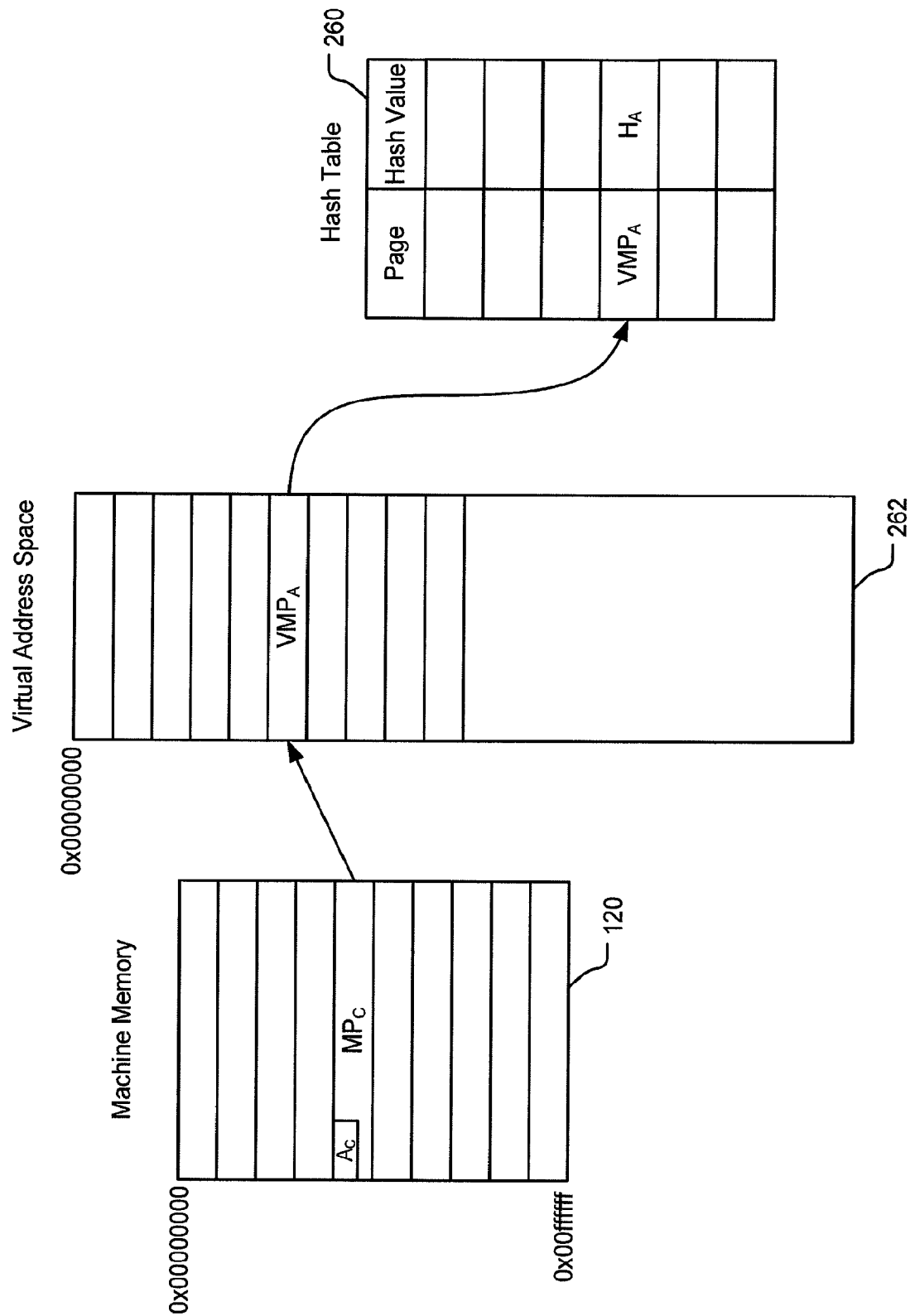
FIG. 3 is a conceptual representation of a mapping from machine memory address, to a virtual address space, to a hash table.

Referring now to FIG. 3, a non-virtualized system in accordance with another embodiment of the present invention may have a hash table 260 that maintains a hash value $H_A$ for a virtual page $VMP_A$ in a virtual address space 262. Each entry $VMP_A$ in the virtual address space 262 points to a machine memory page $MP_S$ in the memory device 120.

Thus, either in a virtualized system or a non-virtualized system, if a hash of the machine memory page stored by one of the subsystems mentioned above is known, or can be retrieved, the stored hash can be used to recreate the corrupted data. The hardware error signaling mechanism associated with the MMU 112 and the memory 120 will provide the address of the corrupted machine memory and the size, n-bits, of the data corruption window in which the corruption occurred. The size of the corruption window varies depending on the architecture. In some cases it may be as small as half a byte, e.g., SPARC, or as large as 4096 bytes in some x86 cases.

In one embodiment, all of the data, including the corrupt data, is copied from the identified corrupt machine memory page where the error occurred to a newly allocated machine memory page. The purpose of copying the data is to deal with persistent errors. For transient errors, it would be relatively straight forward to fix up the data in-place and allow the guest to resume. For persistent errors, the data is reconstructed and the system then transparently remaps the affected machine memory page in guest physical memory to point to the new location.

To reconstruct the data, embodiments of the present invention take advantage of the fact that there is a finite size window and the hash of the correct data is known. In one embodiment, all $2^n$ possible values for the n bits in the window of corruption are iterated or tested by being placed in the corruption window and having the hash calculated over the machine memory page. If the hash of this constructed page matches the stored hash, then the inserted value is recorded as a possibly correct replacement value.

The system must continue checking the rest of the possible values because there could be a hash collision, where two different input values have the same resulting hash. Such hash collisions should be extremely rare for good hash functions and bit sizes, such as the 64-bit hash used by the memory page sharing function. If there are no collisions, then the system can restore the saved reconstructed value to memory and continue operation. In the case of a collision, the error must be treated as being unrecoverable (from the VM's perspective) and the affected VM must be killed while the rest of the system continues as normal.

This "brute-force" method is practical on modern hardware for data corruption windows n up to a certain size. For larger corruption windows, embodiments of the present invention use a scheme that exploits information about corruption patterns that are the most likely to occur. These "likely" corruption patterns include 1-bit and 2-bit flips.

With a 1-bit flip, it is assumed one bit has flipped, i.e., the corrupted data in the corruption window is wrong by only one bit. To check the corruption window would then require checking n different values by inverting one bit at a time. As most of the bits are actually correct, the system can use this to its advantage while trying to discover the corrupted bits.

In the case of 2-bit flips, i.e., two data bits have flipped values within the window, two bits at a time are tested. Iterating over just the combinations of 2-bit data flips greatly reduces the search space. Instead of searching all $2^n$ possible combinations as in the "brute-force" approach, the system searches through "n choose 2" combinations, where this denotes the number of 2-element subsets of an n-element set. Accordingly, "n choose 2" simplifies to $(n*(n-1)/2)$, for an n-bit window, which would allow for effectively searching a much larger corruption window because fewer iterations need be evaluated. It will be noted that 3-bit data flips, even more unlikely to happen than 2-bit data flips, are difficult to detect with current ECC algorithms.

Such optimizations or assumptions, however, are vulnerable to hash collisions. As long as the probability of reconstructing the data incorrectly is less than the probability that a k-bit data flip has occurred, however, such approaches may be reasonable. Suffice it to say that embodiments of the present invention work for k-bit data flips where k<n.

Thus, for example, assume the corrupt machine memory address $MA_C$ and matching memory page $MP_C$ are identified by examining the hardware state as per FIG. 3. The kernel uses its internal state to do a reverse lookup of the virtual memory page $VMP_A$ that is backed by the corrupt $MP_C$. Also using $MP_C$, the kernel looks up the hash value $H_A$ corresponding to $MP_C$.

Thus, embodiments of the present invention work with the GPPN->MPN mapping described above and not the GVPN->GPPN mapping, although both need to be defined, of course. The GVPN->GPPN mapping is under the control of the guest OS, which is typically opaque to the hypervisor, which controls the GPPN->MPN mapping. When a corruption is detected in an MPN, embodiments of the present invention find or determine the corresponding VM and GPPN mapped to that MPN by using a "backmap" or "reverse map" from MPN to <VM,GPPN> maintained by the hypervisor. It is not necessary that the "backmapping" continues "backwards" to find the corresponding GVPN associated with some guest-level process.

As part of the present invention, it will be confirmed that the $\{MP_C \text{ to } VMP_A \text{ to } H_A\}$ relationship is still valid by checking other parameters known to those of ordinary skill in the art. Thus, if there were indications that the guest virtual memory page $VMP_A$ does not reflect the machine memory page $MP_C$, and therefore the stored hash $H_A$ may no longer be accurate, then the corrupt data may not be recoverable unless it could be determined that another guest virtual memory page is mapped to the machine memory page $MP_c$ and for which a valid hash H is stored.

In one embodiment of the present invention, a method 800, as shown in FIGS. 4, 4-A and 4-B, begins with a hardware memory error signal, step 802, where the hardware error signaling mechanism provides the corrupted machine address $MA_c$ of the corrupted machine memory and the size, n-bits, of the corruption window, step 804. Subsequently, the memory page $MP_c$ that includes the corrupt memory address $MA_c$ is identified, step 806, and retrieved. The virtual memory page $VMP_c$ that corresponds to the memory page $MP_c$ is identified and the corresponding stored hash value $H_s$ that corresponds to the identified virtual memory page $VMP_c$ is then retrieved. Optionally, step 810, the data in the identified virtual memory page $VMP_c$, including the corrupt data, is copied to a newly allocated memory page $MP'_c$. This step 810 is optional depending on whether the system has determined if the hardware memory error is indeed transient or persistent. A transient error may be remedied in place whereas a persistent memory error may necessitate moving the machine memory page to a different location so as not to reuse a defective memory page.

In step 812, a Match Flag is set to False prior to beginning the iterations over the various potential values to determine the correct value for the corrupted memory location. In step 814, all n-bits of the identified corruption window are replaced with an iteration $I_k$ of a possible value. The replacement could be based on any of the "brute-force," 1-bit flip, 2-bit flip, etc., approaches described above. A hash $H'_p$ of the memory page $VMP'_c$ is calculated at step 816. Of course, one of ordinary skill in the art would understand that the hash function H would be the same one as used in the system when the hash value was stored for the corresponding virtual memory page.

At step 818, the calculated hash $H'_p$ is compared to the stored hash value H. If the two values are not the same, then control passes to step 820 where it is determined whether or not there are more iterations $I_k$ of the n-bits in the data corruption window to check. If there are more iterations to check, then control passes to step 822 where the next iteration $I_k$ is prepared with the return to step 814.

Returning now to step 818, if the hash value $H'_c$ is equal to the stored hash value $H_s$ then control passes to step 824 where the status of the Match Flag is determined to see if it is already set to True. This comparison is necessary to determine whether or not a possible value has already been found. If this were to occur, then a collision has occurred and it is not possible to determine the correct value for the identified corruption window. If, however, the Match Flag is not set to True, then control passes to step 826 where the current iteration value $I_k$ is stored and, subsequently, the Match Flag is set to True in step 828. Control then returns to step 820, as described above, if there are more iterations to try.

Returning now to step 820, if there are no more iterations to try, then control passes to step 830 where the status of the Match Flag is identified. If the Match Flag is set to True, then one and only one possible value $I_k$ has been identified and control passes to step 832 where the n-bits of the identified memory address are replaced with the identified matching value.

In step 834 the addresses may be remapped to the memory page $MP'_c$ for the affected Virtual Machine (VM) and/or processes, and operation then continues in step 836. Returning now to step 830, if the Match Flag is not set to True, then no potential value has been identified as being the proper replacement value and in step 840 it is determined that the error is not recoverable. In step 842, in one embodiment of the present invention, the affected VM or processes may be killed or suspended as a result of the memory data being corrupted.

Returning now to step 824, if it has been determined that the Match Flag is True and yet another possible value has been identified as resulting in a hash value that is the same as the stored hash value $H_s$, then a collision has occurred and the error is unrecoverable, step 838, with control then passing to step 840 and the process continuing as describe above.

In yet another embodiment of the present invention as shown in FIGS. 5, 5-A and 5-B, a method 900 begins, step 902, where the corrupt machine memory address $MA_c$ has been identified along with the n-bit window and the stored machine memory page $MP_c$ related to the corrupt machine memory address $MA_c$ and its corresponding stored hash value $H_s$ have been retrieved, as above. At step 904, the approach for generating the possible values is chosen as between the brute-force approach, the 1-bit data flip approach or the 2-bit data flip approach. The decision as to which approach to take could be a function of the value of the n-bit window, i.e., the size of the window, the location of the corrupt machine memory address $MA_c$, whether it has been identified previously as having corrupt data, which may indicate a persistent data problem, or other criteria that may be applied at the time. Thus, in step 906 with the 1-bit data flip approach, k=n possible values $PV_x$ are generated. Alternately, if the 2-bit data flip approach is chosen then, step 908, k=(n*(n−1)/2) possible values $PV_x$ are generated. In the brute-force approach, step 909, $K=2^n$ possible values $PV_x$ are generated.

In step 910, K iterations of the memory page $P_c$ are started where, at step 912, the possible value $PV_j$ is inserted in the identified corrupt memory data location. At step 914 a hash value $H_j$ is generated as a function of the modified page $P_c$ with the inserted possible value $PV_j$. The generated value $H_j$ is then stored in an array along with the possible value $PV_j$, at step 916, with the hash of the next iteration then calculated, step 918.

At step 920, a Match Flag is set equal to False and subsequently, a loop from 1 to k is started at step 922, a stored hash $H_j$ and possible value $PV_j$ are retrieved at step 923 and the calculated hash value $H_j$ is compared to the stored hash value $H_S$ at step 924. If there is no match at step 924 then control passes to step 926 and the next hash value $H_j$ is retrieved to be compared to the stored hash value $H_S$.

Returning now to step 924, if the calculated hash value of $H_j$ is equal to the stored hash value $H_S$ then control passes to step 928 where the value of the Match Flag is checked to see whether or not it has already been set to True. If the value of the Match Flag is True then control passes to step 930 where the existence of a collision has been identified and subsequently, step 932, the status of non-recoverability is asserted.

Returning to step 928, if Match Flag is not equal to True then control passes to step 934 where the Match Flag is set to True, i.e., this is the first identification of a matching hash $H_j$ and the replacement value RV is set equal to the possible value $PV_j$ at step 936 with control returning to step 926 for the next hash value $H_j$ comparison.

If, at step 926, there are no more hash values $H_j$ to compare, then control passes to step 938 where the status of the Match Flag is detected and if the Match Flag is not True, then control passes to step 940 where no replacement value has been identified and control returns to the main program where the affected virtual machine and/or processes may be killed or alerted.

If, at step 938, the Match Flag is set to True, then one and only one replacement value RV has been identified and, step 942, this value is inserted into the memory at the identified memory location and for the identified n-bit window.

As described in the embodiments above, once a correct replacement value has been determined, the corrupt data is replaced. In one embodiment of the present invention, the replacement is carried out as a memory page remapping operation. In this embodiment's approach, the corrupted page is "retired," i.e., made unavailable for subsequent allocations. As an example, a corrupted page $MPN_{corrupt}$ is copied to a newly-allocated memory page $MPN_{new}$, and the corrupted bits are corrected as described herein. The hypervisor's old GPPN->$MPN_{corrupt}$ mapping is changed to be GPPN->$MPN_{new}$, effectively remapping the page, which is a transparent operation from the perspective of the guest. Of course, one of ordinary skill in the art will understand that other approaches to the replacement of the corrupt data in the memory page, once identified in accordance with the teachings herein, are available.

Embodiments of this invention can also be implemented in hardware platforms that utilize recent or future microprocessors that contain functionality intended to support virtualization, such as processors incorporating Intel Virtualization Technology (Intel VT-x™) by Intel Corporation and processors incorporating AMD Virtualization (AMD-V™) or Secure Virtual Machine (SVM) technology by Advanced Micro Devices, Inc. A person of skill in the art will understand, for example, the use of "Extended Page Tables" or "Nested Page Tables" for maintaining GPPN->MPN mappings.

It should be noted that while the foregoing embodiments referenced stored hash values with respect to entire memory pages, the present invention may be implemented in those systems where a hash value is known for a portion or region of memory that encompasses the corruption window but which is not aligned with a page boundary. Alternately, a hash value may be known for a portion or region of memory that comprises multiple memory pages, or portions thereof, which encompass the corruption window. In that instance, the hash iterations would be calculated over those portions or regions of memory in order to determine the replacement data value.

The foregoing embodiments of the present invention may be implemented on one or more of the products available from VMware, Inc. of Palo Alto, Calif.

Other embodiments are also possible if any future hardware systems provide additional information about uncorrected memory errors. For example, if the hardware provides ECC checksum information and the ECC algorithm is specified or available, embodiments of the invention can first compute the ECC of a Possible Value and only move on to compute a hash value for the Possible Value if the ECC computation matches the information provided by the hardware. This technique may increase the size of window for which errors may be practically repaired. An ECC computation could also be used to try to resolve a hash collision. If the hash values for multiple Possible Values match the stored hash value for the corrupted memory page, but only one Possible Value results in the ECC information provided by the hardware, then that Possible Value is the proper replacement value. ECC computations can also be performed along with hash computations to increase the certainty that a Possible Value is the proper replacement value, such as in embodiments where hash values are not computed for all possible replacement values.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer program product stored on a non-transitory computer readable medium and configured to perform a computer-implemented method of recovering from a data corruption event in a memory device in a virtualized computer system, the virtualized computer system running a guest operating system on hardware, the virtualized system comprising a virtual machine monitor (VMM) maintaining page table information, the method comprising:

the VMM receiving information from the memory device regarding a first memory address and a corruption window having a window length of n data bits starting at the first memory address;

the VMM identifying, in the maintained page table information, a first page of memory corresponding to the first memory address, the first memory page storing data including the corrupted data;

the VMM identifying a stored hash of the data of the first memory page generated prior to the data corruption event;

the VMM retrieving all data from the corresponding first page of memory, including the data at the first memory address and the corrupt n data bits;

the VMM generating, up to a predetermined number, a plurality of different possible replacement values for the corrupt n data bits; and the VMM identifying one and only one replacement value for the corrupt n data bits that, when inserted in place of the corrupt n data bits, results in the first page of memory having a hash value that is equal to the stored hash value.

2. The computer program product of claim 1, wherein the generating the plurality of different possible replacement values comprises:
generating $2^n$ different data values comprising all possible combinations of data within the corruption window.

3. The computer program product of claim 1, wherein the generating the plurality of different possible replacement values comprises:
generating $(n*(n-1)/2)$ different data values comprising all possible combinations of 2-bit data flips within the corruption window.

4. The computer program product of claim 1, wherein the generating the plurality of different possible replacement values comprises:
generating n different data values comprising all possible combinations of 1-bit data flips within the corruption window.

5. The computer program product of claim 1, further comprising:
copying the data of the retrieved first memory page to a newly allocated second memory page in memory, wherein the generating the plurality of different possible replacement values is performed on the data stored in the second memory page.

6. The computer program product of claim 5, further comprising:
replacing all mappings to the first memory page with mappings to the second memory page.

7. The computer program product of claim 6, further comprising:
making the first memory page unavailable to any process in the system.

8. A computer system including a storage device storing computer instructions configured to perform a computer-implemented method of recovering from a data corruption event in a memory device in the computer system, the computer system further including one or more central processing units for executing the computer instructions, the computer system running a virtual machine monitor (VMM), the VMM supporting operation of a guest operating system and maintaining page table information, the method comprising:
the VMM receiving information from the memory device regarding a first memory address and a corruption window having a window length of n data bits starting at the first memory address;
the VMM identifying, in the maintained page table information, a first page of memory corresponding to the first memory address, the first memory page storing data including the corrupted data;
the VMM identifying a stored hash of the data of the first memory page generated prior to the data corruption event;
the VMM retrieving all data from the corresponding first page of memory, including the data at the first memory address and the corrupt n data bits;
the VMM generating, up to a predetermined number, a plurality of different possible replacement values for the corrupt n data bits; and
the VMM identifying one and only one replacement value for the corrupt n data bits that, when inserted in place of the corrupt n data bits, results in the first page of memory having a hash value that is equal to the stored hash value.

9. The computer program product of claim 8, wherein the generating the plurality of different possible replacement values comprises:
generating $2^n$ different data values comprising all possible combinations of data within the corruption window.

10. The computer program product of claim 8, wherein the generating the plurality of different possible replacement values comprises:
generating $(n*(n-1)/2)$ different data values comprising all possible combinations of 2-bit data flips within the corruption window.

11. The computer program product of claim 8, wherein the generating the plurality of different possible replacement values comprises:
generating n different data values comprising all possible combinations of 1-bit data flips within the corruption window.

12. The computer program product of claim 8, further comprising:
copying the data of the retrieved first memory page to a newly allocated second memory page in memory, wherein the generating the plurality of different possible replacement values is performed on the data stored in the second memory page.

13. The computer program product of claim 12, further comprising:
replacing all mappings to the first memory page with mappings to the second memory page.

14. The computer program product of claim 13, further comprising:
making the first memory page unavailable to any process in the system.

15. A computer system including a storage device storing computer instructions configured to perform a computer-implemented method of correcting corrupted data in a corruption window of length n at a first location in a memory device in the computer system, the computer system further including one or more central processing units for executing the computer instructions, the method comprising:
retrieving a stored hash $H_S$ of data stored in a first machine memory page containing the first location prior to corruption;
generating a plurality of data values;
for each respective data value from the plurality of generated data values:
replacing the corrupted data in the corruption window with the respective data value;
generating a hash $H_C$ of the first machine memory page with the respective data value in the corruption window;
comparing the calculated hash value $H_C$ to the stored hash value $H_S$;
and
if $H_C=H_S$, identifying the corresponding data value as a replacement data value; and
if one and only one replacement data value has been identified after all data values from the plurality of data values have been inserted, replacing the data in the corruption window of the first memory page with the identified replacement data value.

16. The computer system of claim 15, wherein generating the plurality of data values comprises:
generating all unique possible values for the data in the corruption window.

17. The computer system of claim 15, wherein generating the plurality of data values comprises:
generating all unique 1-bit data flip values for the corruption window.

18. The computer system of claim 15, wherein generating the plurality of data values comprises:

generating all unique 2-bit data flip values for the corruption window.

19. The computer system of claim 15, further comprising: copying the data of the first memory page to a newly allocated second memory page in memory, wherein the generating the plurality of data values is performed on the data stored in the second memory page.

20. The computer system of claim 19, further comprising: replacing all mappings to the first memory page with mappings to the second memory page.

21. The computer system of claim 20, further comprising: making the first memory page unavailable to any process in the system.

\* \* \* \* \*